Oct. 23, 1934.  E. K. MADAN  1,977,885
LIQUID TRAP OR SEAL AND METHOD OF MAKING THE SAME
Filed April 24, 1931
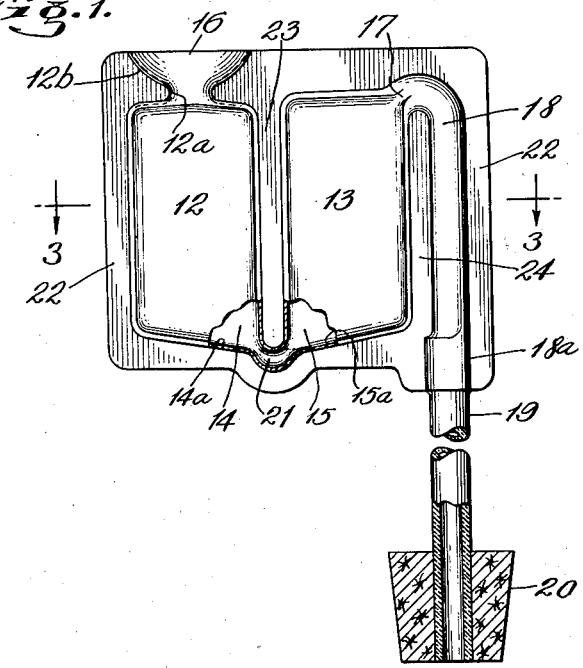
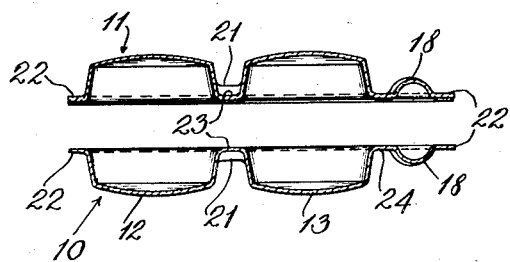
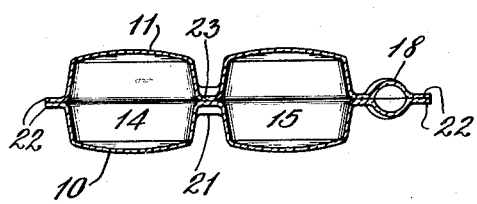
INVENTOR.
EDWARD K. MADAN
BY Howard L. Thompson
ATTORNEY.

Patented Oct. 23, 1934

1,977,885

UNITED STATES PATENT OFFICE 1,977,885

LIQUID TRAP OR SEAL AND METHOD OF MAKING THE SAME

Edward K. Madan, Maplewood, N. J.

Application April 24, 1931, Serial No. 532,517

8 Claims. (Cl. 215—56)

This invention relates to trap or seal devices in which a liquid is adapted to be placed to form a seal for a discharge or vent tube leading into the device; and the object of the invention is to provide a device of the class specified, the body portion of which is made from two celluloid parts secured together and including a tubular body secured within and between said parts and projecting therefrom; a further object being to provide a trap of the class specified having a comparatively short and small substantially V-shaped connecting tube disposed between two relatively large chambers in said body whereby a relatively small amount of liquid or fluid will form a liquid seal within and between said chambers; a further object being to provide a device of the class specified having oblong chambers with downwardly inclined and converging bottom walls leading into the V-shaped tubular trap disposed between and communicating with said chambers; a further object being to provide means for passing a fluid into one of said chambers and a goose-neck discharge tube communicating with the upper end of the other chamber and with which the projecting tubular body communicates; a still further object being to provide a device of the class described, which is unbreakable and which may be composed of transparent or translucent celluloid or similar material; and with these and other objects in view, the invention consists in a trap or seal device of the class specified, made in accordance with the method and of the structure hereinafter more fully described and claimed.

The invention is fully disclosed in the following specification, of which the accompanying drawing forms a part, in which the separate parts of my improvement are designated by suitable reference characters in each of the views, and in which:

Fig. 1 is a side and sectional view of a device made according to my invention.

Fig. 2 is a transverse sectional view through the two body parts of the device arranged in spaced relation, indicating the method of securing said parts together; and, Fig. 3 is a section on the line 3—3 of Fig. 1, with the parts of the body portion attached.

In the construction of traps or seals of the class under consideration, it has been customary to fashion the same from blown glass tubes, rendering the devices expensive as well as subject to breakage; and the object of my invention is to provide a device which is substantially unbreakable, and which may be manufactured and sold at a comparatively low price.

In the drawing, I have shown one form of device for carrying my invention into effect, it being understood that the particular shape and contour of the device is a matter of design and fancy, and various changes may be made in the structure and appearance of the device within the scope of the basic principles of my invention.

The device consists of two body parts 10 and 11 shown separated in Fig. 2 of the drawing, each part being of similar form but being made in lefts and rights, and consists of outwardly pressed or projecting bodies 12 and 13 forming large, substantially rectangular chambers 14 and 15 within and between the parts when secured together. The bodies 12 terminate in their upper ends in reduced necks 12a and outwardly flared funnel-shaped portions 12b forming an admission funnel 16 for fluid to be placed in the device. The upper end of the bodies 13 has discharge ports 17 opening into a downwardly extending tubular body 18 formed by each part 10 and 11 of the device. The tubular body opens into an enlargement 18a at the lower end of the device in which a relatively rigid tube 19 is secured, the tube projecting beyond the device facilitating its attachment with a suitable support through a cork or other packing or mounting member 20 attached to the lower end of the tube. Formed between the chambers 14 and 15 at the lower end thereof is a small V-shaped tubular passage 21. The bottom walls 14a and 15a of the chambers 14 and 15 are inclined downwardly or converged into the tube 21, so that the liquid in the chambers 14 and 15 will drain by gravity into the tube 21. By virtue of the size of the tube and the small diameter thereof, it will be apparent that a relatively small amount of liquid will effect the seal between the chambers 14 and 15. In fact, the liquid contained in the tube 21 alone will effect this seal, although in practice, it is the custom to maintain the chambers 14 and 15 substantially one third full of the liquid, especially when water or the like is used.

Aside from the admission opening 16 and the enlargement 18a, the entire outer wall of the device is secured together by the abutting flange portions 22. In like manner, the wall portions 23 between the chambers 14 and 15 abut and are secured together, thus restricting the communication between said chambers to the tube 21. The tubular body 18 is separated from the chamber 13 by similar wall portions 24 which are secured together.

In the method of forming the device, each part 10 and 11 is formed by molding or the use of suitable dies, depending upon the material employed in the construction thereof, it being understood that the device may be made from any suitable material capable of being molded or stamped, including various metallic materials. However, it is preferable to use such material as celluloid by virtue of the fact that the same may be made transparent or translucent. However, opaque celluloid may also be employed.

After the two parts 10 and 11 are made, and assuming that two celluloid parts are to be joined, a celluloid solvent is applied to the flanges 22 and walls 23 on at least one of the parts, by placing the inner surfaces thereof upon a pad containing the solvent solution, after which the two parts are placed together and compressed in a suitable die to insure adhesion of the flanges and walls.

In this connection, I also wish to call attention to the fact that a colored solvent may be used so as to provide a colored border in the flanged walls 22 and the walls 23 and 24, producing a very attractive appearance in the completed device, especially when the portions 12—12b and 13 and 18 are transparent or of another ground color.

After the two parts have been secured together, the end of the tube 19 is dipped in a suitable cement, or the cement is applied to the end of the tube, and this tube is then placed in the enlargement 18a to secure the tube therein, thus forming a unit body structure of the parts 10, 11 and 19. It will be noted that the wall structure of the tube 19 is comparatively heavy so as to provide the required strength and rigidity to this tube, facilitating its mounting in a cork or other stopper body, as will be apparent.

My improved trap is designed for use as a vent for tanks and other containers, the end of the device, having the cork 20, being mounted in an opening or port leading to the tank or container so that gases in such tank or container may escape through the trap, or the trap may be used to relieve any internal pressure and yet provide an air seal preventing the admission of air into the tank or container.

It will be understood that my invention is not limited to the specific form of the device herein shown and described, nor to the precise manner of constructing the same, and various changes in and modifications of the structure and method herein set out may be made within the scope of the appended claims, without departing from the spirit of my invention or sacrificing its advantages.

Having fully described my invention, what I claim as new and desire to secure by Letters Patent, is:

1. A device of the class described comprising a body portion having two large substantially rectangular chambers therein and arranged in close proximity to each other with adjacent side walls of the chambers in parallel relation to each other, said body portion having a small substantially V-shaped passage joining and communicating with the lower adjacent corner portions of said chambers forming a relatively small liquid trap between said chambers, one of said chambers opening outwardly through the top of the device and said body portion including a tubular member disposed at one side of the other of said chambers and communicating with the upper end thereof and opening outwardly through the lower end of the device, the bottom walls of the chambers of the device being inclined downwardly in the direction of said trap, and said device being composed of two similar parts joined centrally and longitudinally of the chambers, trap and tubular member, each part of the device having a boundary wall surrounding said chambers, trap and tubular member.

2. A device of the class described comprising a body portion having two large substantially rectangular chambers therein and arranged in close proximity to each other with adjacent side walls of the chambers in parallel relation to each other, said body portion having a small substantially V-shaped passage joining and communicating with the lower adjacent corner portions of said chambers forming a relatively small liquid trap between said chambers, one of said chambers opening outwardly through the top of the device and said body portion including a tubular member disposed at one side of the other of said chambers and communicating with the upper end thereof and opening outwardly through the lower end of the device, the bottom walls of the chambers of the device being inclined downwardly in the direction of said trap, said device being composed of two similar parts joined centrally and longitudinally of the chambers, trap and tubular member, each part of the device having a boundary wall surrounding said chambers, trap and tubular member, and the bottom and side walls of said chambers being beveled to provide a greater area in said chambers at the intersection of the separate parts of the device than at the outer walls of said chambers.

3. A device of the class described comprising a body portion having two large substantially rectangular chambers therein and arranged in close proximity to each other with adjacent side walls of the chambers in parallel relation to each other, said body portion having a small substantially V-shaped passage joining and communicating with the lower adjacent corner portions of said chambers forming a relatively small liquid trap between said chambers, one of said chambers opening outwardly through the top of the device and said body portion including a tubular member disposed at one side of the other of said chambers and communicating with the upper end thereof and opening outwardly through the lower end of the device, the bottom walls of the chambers of the device being inclined downwardly in the direction of said trap, said device being composed of two similar parts joined centrally and longitudinally of the chambers, trap and tubular member, each part of the device having a boundary wall surrounding said chambers, trap and tubular member, the bottom and side walls of said chambers being beveled to provide a greater area in said chambers at the intersection of the separate parts of the device than at the outer walls of said chambers, the lower end portion of said tubular member being enlarged, and a discharge tube mounted in and secured to the enlarged portion of said member and projecting below the lower end of said device.

4. A seal or trap device of the class described formed from two substantially oblong and rectangular body parts of sheet material, each part being similarly fashioned to form when said parts are secured together two large substantially rectangular chambers arranged in close proximity and joined at lower adjacent corners in a small V-shaped trap passage, an outwardly flaring admission opening at the top of one chamber and a tubular member at one side of the other chamber communicating with the top of said chamber and opening outwardly through the lower end of the device.

5. A seal or trap device of the class described formed from two substantially oblong and rectangular body parts of sheet material, each part being similarly fashioned to form when said parts are secured together two large substantially rectangular chambers arranged in close proximity and joined at lower adjacent corners in a small V-shaped trap passage, an outwardly flaring admission opening at the top of one chamber and a tubular member at one side of the other chamber communicating with the top of said chamber and opening outwardly through the lower end of the device, and an independent discharge tube secured within the lower end of said tubular member and projecting below the lower end of said device.

6. A seal or trap device of the class described formed from two substantially oblong and rectangular body parts of sheet material, each part being similarly fashioned to form when said parts are secured together two large substantially rectangular chambers arranged in close proximity and joined at lower adjacent corners in a small V-shaped trap passage, an outwardly flaring admission opening at the top of one chamber and a tubular member at one side of the other chamber communicating with the top of said chamber and opening outwardly through the lower end of the device, and the bottom walls of said chambers being beveled downwardly in a transverse direction and inclined from the outer corner portions thereof downwardly to said V-shaped trap.

7. A seal or trap device of the class described formed from two substantially oblong and rectangular body parts of sheet material, each part being similarly fashioned to form when said parts are secured together two large substantially rectangular chambers arranged in close proximity and joined at lower adjacent corners in a small V-shaped trap passage, an outwardly flaring admission opening at the top of one chamber and a tubular member at one side of the other chamber communicating with the top of said chamber and opening outwardly through the lower end of the device, the bottom walls of said chambers being beveled downwardly in a transverse direction and inclined from the outer corner portions thereof downwardly to said V-shaped trap, and the upper wall of the passage of said trap being substantially in horizontal alinement with the bottom wall of each chamber.

8. A seal or trap device of the class described formed from two substantially oblong and rectangular body parts of sheet material, each part being similarly fashioned to form when said parts are secured together two large substantially rectangular chambers arranged in close proximity and joined at lower adjacent corners in a small V-shaped trap passage, an outwardly flaring admission opening at the top of one chamber and a tubular member at one side of the other chamber communicating with the top of said chamber and opening outwardly through the lower end of the device, and the separate parts of the device being composed of celluloid.

EDWARD K. MADAN.